H. G. BERENTSEN.
DYNAMO ELECTRIC MACHINE.
APPLICATION FILED JULY 28, 1909.

984,260.

Patented Feb. 14, 1911.

WITNESSES:

INVENTOR
Hans G. Berentsen
BY
ATTORNEY

UNITED STATES PATENT OFFICE.

HANS G. BERENTSEN, OF PITTSBURG, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

984,260.  Specification of Letters Patent.  Patented Feb. 14, 1911.

Application filed July 28, 1909. Serial No. 510,013.

*To all whom it may concern:*

Be it known that I, HANS G. BERENTSEN, a citizen of the United States, and a resident of Pittsburg, in the county of Allegheny and State of Pennsylvania, have invented a new and useful Improvement in Dynamo-Electric Machines, of which the following is a specification.

My invention relates to dynamo-electric machines and particularly to means for fastening the end members to the central body members of the field magnet frames of such machines, and it has for its object to provide a simple, inexpensive and easily applied means whereby machining those portions of the castings which are ordinarily in engagement with each other may be avoided and the cheapening of the structure be effected without impairing its usefulness in operation.

The stationary members of dynamo-electric machines ordinarily comprise central frame portions which either constitute portions of the magnetic circuit or are utilized to support the laminated structures which constitute such circuits and end members, which, in small machines, are provided with shaft bearings and, in larger machines, serve as protecting devices for the windings or as supports for certain auxiliary devices.

In view of the roughness and surface irregularities of castings, it has heretofore been found necessary to plane off the surfaces of the main portions of the frame and the corresponding surfaces of the end members which are to engage therewith in order to make the proper fit between the said parts. This machine work involves considerable expense and is unnecessary except for the purpose just mentioned.

I propose to avoid the above mentioned machine work by the means illustrated in the accompanying drawing, in which—

Figure 1:
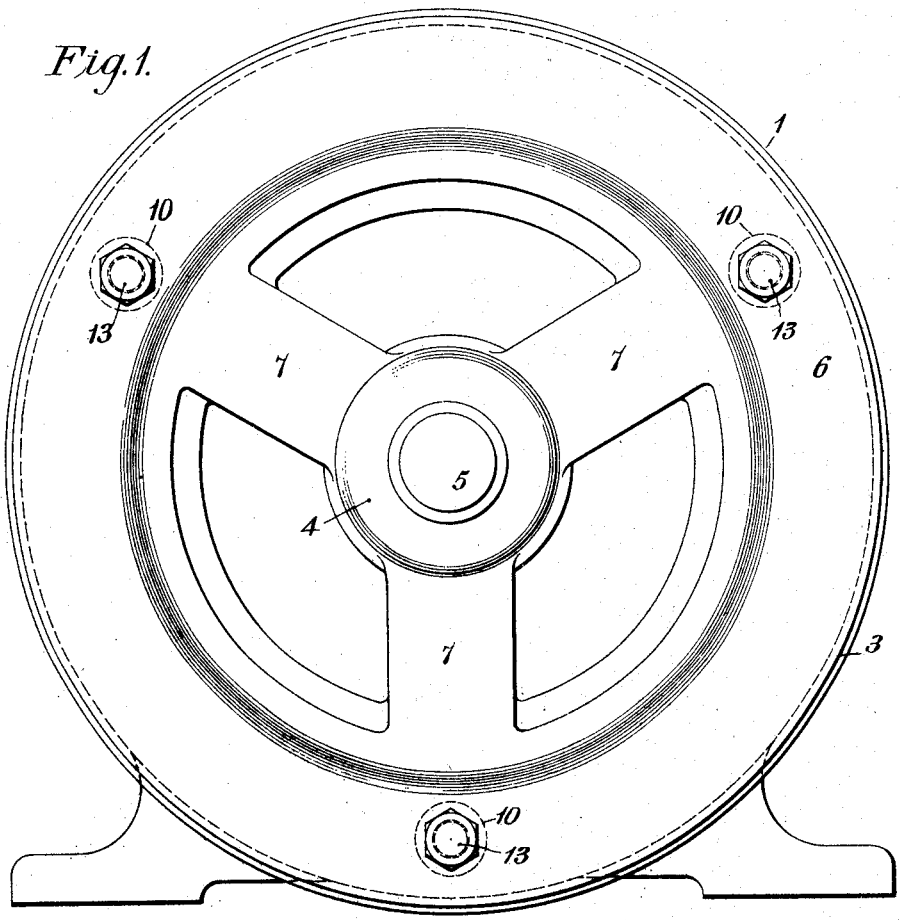
Figure 3:
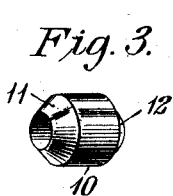
Figure 2:
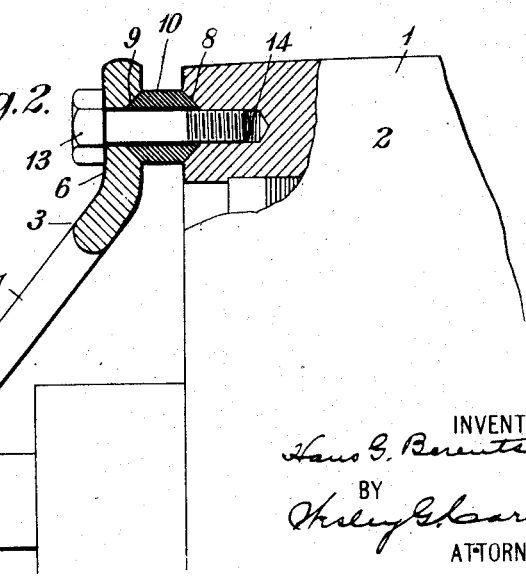
Figure 2:
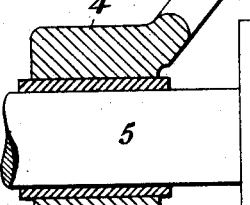

Figure 1 is an end elevation of a machine constructed in accordance with my invention. Fig. 2 is a view, partially in side elevation and partially in section, of a portion of one end of the machine shown in Fig. 1, and Fig. 3 is a detail perspective view of one feature of my invention.

As here shown, the machine 1 is an electric motor of comparatively small size the field magnet frame of which comprises a body member 2 and end members 3 (one only being shown) each of which is provided with a suitable bearing 4 for a shaft 5. The outer annular portion 6 of the member 3, which is connected to the shaft bearing 4 by a plurality of arms 7, would ordinarily be provided with a smooth inner surface by means of a suitable planing machine, and the adjacent end of the body member 2 of the machine frame would be correspondingly planed to fit against such surface. In order to avoid such machine work, I provide each of the members 2 and 3 with a plurality of recesses 8 and 9, three such recesses being shown in each member in this instance. The recesses are preferably of frusto-conical form in order to insure satisfactory centering of the parts. I provide also a plurality of hollow blocks or spacing bushings 10, the body portions of which may be of any form (here shown as cylindrical) but the ends 11 and 12 of which are turned to frusto-conical form in order to fit the recesses 8 and 9. A plurality of bolts 13 are provided which project through the end member 3 and the hollow blocks 10 and screw into screw-threaded holes or recesses 14 in the member 2, as clearly indicated in Fig. 2. This structure and arrangement of parts insure a rigid coöperation of the members and, at the same time, not only enable me to avoid a material item of expense in manufacturing but also provide ventilating spaces between the members 2 and 3.

The form and dimensions of the spacing blocks 10 may, of course, be different from what I have shown and described without departing from my invention.

I claim as my invention:

1. The combination with the body member of a machine frame and an end member provided with a shaft bearing, at least one of said members being provided with face recesses having flaring sides, of a plurality of bolts for clamping said members together and spacing bushings surrounding said bolts between said members and having tapered ends to fit into said recesses.

2. The combination with the body member of a machine frame and an end member having a shaft bearing, said members having corresponding conical recesses in their opposing faces, of tubular spacing blocks having conical ends to fit into said recesses, and bolts projecting through said end member and said tubular spacing blocks and into said body member.

3. The combination with a body member of a dynamo-electric machine frame, and an end member having a plurality of frusto-conical recesses in its inner face, of a plurality of bolts for clamping said members together, and spacing blocks or bushings having frusto-conical outer ends seated in the recesses in said end member, said bolts projecting through the end member and spacing blocks into the body member.

4. The combination with the body member of a dynamo-electric machine frame having a plurality of frusto-conical end recesses, of an end member having a shaft bearing, spacing blocks having frusto-conical inner ends seated in the recesses in said body member and bolts projecting through the end member and said blocks and into the body member.

5. The combination with the body member of a dynamo-electric machine frame having a plurality of frusto-conical end recesses and an end member having corresponding frusto-conical recesses, of spacing blocks or bushings having ends adapted to fit into said recesses and bolts projecting through the end member and the spacing blocks and into the body member.

In testimony whereof, I have hereunto subscribed my name this 17th day of July, 1909.

HANS G. BERENTSEN.

Witnesses:
A. K. METZ,
B. B. HINES.